United States Patent [19]

Watson

[11] Patent Number: 5,254,623
[45] Date of Patent: Oct. 19, 1993

[54] CURABLE FLUORINATED ORGANOSILOXANE COMPOSITIONS EXHIBITING IMPROVED ADHESION

[75] Inventor: Michael J. Watson, Midland, Mich.

[73] Assignee: Dow Corning Corporation, Midland, Mich.

[21] Appl. No.: 951,517

[22] Filed: Sep. 25, 1992

[51] Int. Cl.$^5$ ................................................ C08F 8/00
[52] U.S. Cl. .................................... 525/100; 524/730; 524/731
[58] Field of Search ................. 524/730, 731; 525/100

[56] References Cited

U.S. PATENT DOCUMENTS

| | | | |
|---|---|---|---|
| 4,082,726 | 4/1978 | Mine et al. | 260/46.5 UA |
| 4,087,585 | 5/1978 | Schulz | 428/429 |
| 4,311,739 | 1/1982 | Hardman et al. | 427/387 |
| 4,677,161 | 6/1987 | Suzuki et al. | 524/862 |
| 4,701,503 | 10/1987 | Sato | 525/478 |
| 4,732,932 | 3/1988 | Waldern | 524/862 |
| 4,786,701 | 12/1988 | Tanaka | 528/15 |
| 4,988,758 | 1/1991 | Fukuda et al. | 524/492 |

*Primary Examiner*—Melvyn I. Marquis
*Attorney, Agent, or Firm*—Robert Spector

[57] ABSTRACT

The adhesion developed during curing of organosiloxane compositions comprising a polyorganosiloxane containing silicon-bonded alkenyl and fluorinated alkyl radicals, at least one organosiloxane as the curing agent, a platinum-containing hydrosilation catalyst and conventional organosiloxane adhesion promoters is substantially improved when the alkenyl-substituted siloxane units are separated from the closest fluorine-containing siloxane units by at least one dimethylsiloxane unit.

6 Claims, No Drawings

CURABLE FLUORINATED ORGANOSILOXANE COMPOSITIONS EXHIBITING IMPROVED ADHESION

BACKGROUND OF THE INVENTION

1. Field of the Invention

This invention relates to organosiloxane compositions that cure by a platinum-catalyzed hydrosilation reaction. One of the ingredients in the compositions is a polyorganosiloxane containing silicon-bonded fluorinated hydrocarbon radicals and at least two silicon-bonded alkenyl radicals per molecule. More particularly, this invention relates to curable organosiloxane compositions of this type that exhibit excellent adhesion to a variety of substrates that the compositions are in contact with during curing.

2. Background Information

A shortcoming of many organosiloxane compositions that cure by a platinum-catalyzed hydrosilation reaction is the relatively poor adhesion of these compositions to inorganic substrates such as metals and organic substrates such as synthetic organic polymers. One method for improving the adhesion of these compositions is by applying a primer to the surface of the substrate that will be coated with the composition. Alkoxysilanes containing a organofunctional group such as alkenyl, epoxy, amino, acryloxy or methacryloxy that is bonded to silicon by a carbon are frequently used as the active ingredient in these primer compositions. The type of organofunctional group present on the silane is determined at least in part by the type of substrate.

The additional steps of preparing the primer composition and applying it to a substrate can be eliminated by adding the organofunctional silane ingredient of the primer directly to the curable organosiloxane composition as an adhesion promoter.

A preferred class of adhesion promoters are silanes or organosiloxanes containing one or more silicon-bonded alkoxy groups per molecule and at least one functional group that is reactive with the substrate to which bonding is desired. These functional groups include but are not limited to alkenyl radicals, ethylenically unsaturated groups such as 3-methacryoxypropyl and epoxy groups such as glycidoxypropyl. Typical classes of adhesion promoters for use with organosiloxane compositions that cure by a platinum group metal-catalyzed hydrosilation reaction include but are not limited to those described in U.S. Pat. No. 4,087,585 (issued May 2, 1978); U.S. Pat. No. 4,082,726 (issued Apr. 4, 1978); U.S. Pat. No. 4,311,739 (issued Jan. 19, 1982); U.S. Pat. No. 4,677,161 (issued June 30, 1987); U.S. Pat. No. 4,701,503 (issued Oct. 20, 1987) U.S. Pat. No. 4,732,932 (issued Mar. 22, 1988) and U.S. Pat. No. 4,786,701 (issued Nov. 22, 1988). The curable compositions described in these patents contain a polyorganosiloxane with at least two alkenyl radicals per molecule, an organohydrogensiloxane and a hydrosilation catalyst that is typically a metal from the platinum group of the periodic table or a compound of such a metal.

The hydrocarbon radicals that are bonded to the silicon atoms of the alkenyl-substituted polyorganosiloxanes and organohydrogensiloxanes described in the aforementioned patents relating to adhesion promoters are typically defined as containing from 1 to 10 carbon atoms and being substituted with fluorine or other halogen atom, even though the examples are typically limited to polyorganosiloxanes and organohydrogensiloxanes containing methyl radicals as the silicon-bonded hydrocarbon radicals.

The present inventor discovered that little if any additional adhesion is obtained using some known adhesion promoters when the silicon atoms adjacent to the silicon atoms containing a vinyl or other alkenyl radical are bonded to a fluorinated hydrocarbon radical such as 3,3,3-trifluoropropyl.

Curable organosiloxane compositions containing at least one polydiorganosiloxane having terminal vinyl-substituted siloxane units and diorganosiloxane units with silicon-bonded fluorinated hydrocarbon radicals such as 3,3,3-trifluoropropylsiloxane units are described in U.S. Pat. No. 4,988,758, which issued to T. Fukuda et al. on Jan. 29, 1991. The characterizing feature of these polydiorganosiloxanes is the presence of an average of at least two dimethylsiloxane units between the vinyl-substituted silicon atom and the nearest silicon atom containing a fluorinated hydrocarbon radical. These compositions are converted to cured materials by reaction of the polyorganosiloxane with an organic peroxide or with an organohydrogensiloxane in the presence of a platinum-containing hydrosilation catalyst.

The advantage alleged in U.S. Pat. No. 4,988,758 for compositions containing the type of polydiorganosiloxane described in this patent is a faster cure rate relative to compositions containing polyorganosiloxanes wherein the silicon atoms containing the alkenyl radicals are adjacent to silicon atoms containing fluorinated hydrocarbon radicals. This patent does not discuss the subject of adhesion or recommend the use of any ingredients to improve the adhesion to substrates that are in contact with the organosiloxane composition during curing.

SUMMARY OF THE INVENTION

One objective of this invention is to improve the adhesion to organic and inorganic substrates that is developed during curing by a platinum-catalyzed hydrosilation reaction of organosiloxane compositions wherein at least 20 percent of the silicon atoms on the alkenyl-functional polyorganosiloxane(s) are bonded to a fluorinated hydrocarbon radical.

It has now been found that the objective of this invention can be achieved by using conventional adhesion promoters for organosiloxane compositions in combination with a curable composition containing a fluorinated polyorganosiloxane wherein the alkenyl-substituted siloxane units are separated by an average of at least two dimethylsiloxane units from the closest siloxane unit containing a fluorinated hydrocarbon radical.

DETAILED DESCRIPTION OF THE INVENTION

This invention provides a curable organosiloxane composition comprising

A. a polyorganosiloxane containing at least two silicon-bonded alkenyl radicals per molecule where at least 20 percent of the siloxane units contain a silicon-bonded perfluoroalkylethyl radical and the silicon atoms containing said alkenyl radicals are separated from the closest silicon atom containing said perfluoroalkylethyl group by at least two dimethylsiloxane units, B. as the curing agent for said composition, an organohydrogensiloxane containing an average of more than two silicon-bonded hydrogen atoms per molecule, C. an amount of a hydrosilation catalyst sufficient to promote curing of said composition, where said catalyst is selected from the group consisting of metals from the platinum group of the periodic table and compounds of these metals, and D. as the adhesion promoter, an alkoxy-substituted organosilicon compound containing at least one organofunctional substituent bonded to silicon through carbon, where said substituent is selected from the group consisting of epoxy, alkenyl, alkyl esters of ethylenically unsaturated carboxylic acids and polymers derived from said acids, and the concentration of said organosilicon compound is sufficient to achieve adhesion between said composition and a substrate in contact with said composition during curing.

The characterizing feature of the present organosiloxane compositions is the substantial improvement in the adhesion to a variety of substrates that is developed during curing relative to compositions containing the same adhesion promoter and a polyorganosiloxane wherein an organosiloxane unit containing a perfluoroalkylethyl radical is adjacent to a silicon atom bonded to an alkenyl radical.

The adhesion promoters of the present invention are organosilicon compounds containing at least one silicon-bonded alkoxy group and at least one adhesion-promoting organofunctional substituent that is bonded to silicon through carbon and contains an epoxy, amino or an ethylenically unsaturated group such as alkenyl, acryloxy or methacryloxy.

The ingredients of the present organosiloxane compositions will now be explained in detail.

The Alkenyl-Substituted Fluorinated Polyorganosiloxane

Ingredient A

The feature considered responsible for the improved adhesion developed during curing of the present compositions is the presence in the polyorganosiloxane containing alkenyl and fluorinated hydrocarbon radicals of an average of at least two dimethylsiloxane units, $-(CH_3)_2SiO-$, between the silicon atoms containing the alkenyl radical, which can be represented by the formula $R_1R_2SiO$ or $R_1(R_2)_2SiO_{178}$, and the closest silicon atom containing a perfluoroalkylethyl radical. In these formulae $R_1$ represents an alkenyl radical containing from 2 to about 8 carbon atoms and $R^2$ represents an alkyl radical containing 1 or 2 carbon atoms. Preferably $R^1$ is vinyl or 5-hexenyl and $R^2$ is methyl.

A preferred embodiment of ingredient A is a polydiorganosiloxane wherein from 20 to about 95 mole percent of the diorganosiloxane units are methyl-3,3,3-trifluoropropylsiloxane, the remaining diorganosiloxane units are dimethylsiloxane, the terminal units are dimethylvinylsiloxy, and the terminal units are separated from the closest fluorine-containing siloxane unit by at least two dimethylsiloxane units. Preferably at least 40 mole percent of the units are methyl-3,3,3-trifluoropropylsiloxane.

Preferred embodiments of ingredient A can be prepared by polymerizing the corresponding cyclic oligomeric disiloxane(s) in the presence of a alkali metal compound and a chain terminating agent that is a dimethylvinylsiloxy-terminated polydimethylsiloxane containing an average of from 6 to about 20 dimethylsiloxane units per molecule. Specific methods for preparing preferred embodiments of ingredient A are described in the aforementioned U.S. Pat. No. 4,988,758.

The viscosity of ingredient A can range from a free flowing liquid to a semi-solid gum. A viscosity within the range of from 0.1 to 100,000 Pa.s is preferred to obtain cured organosiloxane materials exhibiting useful physical properties using conventional processing equipment.

2. The Organohydrogensiloxane Curing Agent Ingredient B

The organosiloxane compositions of this invention are cured by a hydrosilation reaction catalyzed by a metal from the platinum group of the periodic table or a compound of such a metal. The curing agent is an organohydrogensiloxane containing an average of more than two silicon bonded hydrogen atoms per molecule. The organohydrogensiloxane contains as few as four silicon atoms per molecule up to an average of 20 or more, and can have a viscosity of up to 10 Pa.s or higher at 25° C. The repeating units of this ingredient include but are not limited to $HSiO_{1.5}$, $R^3HSiO$ and/or $R^3{}_2HSiO_{0.5}$ in addition to one or more monoorganosiloxy, diorganosiloxane, triorganosiloxy and $SiO_{4/2}$ units. In these formulae each $R^3$ represents an unsubstituted monovalent hydrocarbon radical or a perfluoroalkylethyl radical.

A preferred class of organohydrogensiloxanes are copolymers consisting essentially of the repeating units $R^3HSiO$ and $R^3{}_2SiO$ units, where the $R^3$ radicals are free of ethylenic unsaturation and are individually selected from monovalent hydrocarbon and perfluoroalkylethyl radicals and the $R^3{}_2SiO$ units constitute from 0.5 to 50 mole percent of the copolymer. Copolymers of this type can be prepared by a controlled hydrolysis of a mixture comprising the corresponding organosilicon halides, such as the chlorides, or the corresponding alkoxides, or a mixture of the corresponding cyclic organosiloxanes and a suitable chain terminating agent. These and other methods for preparing the preferred organohydrogensiloxanes of this invention are sufficiently well known that a detailed description is not required in this specification.

The non-fluorinated hydrocarbon radical is preferably methyl, and the fluorinated hydrocarbon radical is 3,3,3-trifluoropropyl.

Proper curing of the present compositions requires that ingredients A and B be miscible with one another.

The molar ratio of silicon bonded hydrogen atoms present in the organohydrogensiloxane to vinyl or other alkenyl radicals, referred to as the SiH/alkenyl ratio, is determined by a number of considerations, including the physical properties of the cured material prepared from the present compositions. The SiH/alkenyl ratio is typically from 0.4 to 3.5. The optimum ratio for particular compositions will be determined at least in part by the molecular weights of ingredients A and B. The optimum range of this ratio can readily be determined by those skilled in the art with a minimum of experimentation.

In addition to the organohydrogensiloxane containing an average of more than two silicon-bonded hydrogen atoms per molecule the present compositions may also contain a polyorganosiloxane, preferably a polydiorganosiloxane, having silicon-bonded hydrogen atoms only at the terminal positions. This type of organohydrogensiloxane is referred to as a chain extender, and does not provide crosslinking between adjacent molecules of ingredient A. The chain extender is typically present when it is desired to decrease the hardness and/or increase the elongation of the cured material.

3. The Platinum Hydrosilation Catalyst Ingredient C and Optional Inhibitor

Hydrosilation reactions are typically conducted in the presence of a catalyst that is a metal from the platinum group of the periodic table or a compound of such a metal. Platinum, rhodium and compounds of these metals have been shown to catalyze hydrosilation reactions.

Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968.

Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70 degrees C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agents and hydrosilation catalysts may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the working time or pot life of a curable composition under ambient conditions, this can be accomplished by the addition of one or more olefinically substituted siloxanes of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

When inhibitors will not provide the desired long term storage stability, it may be necessary to separate the organohydrogensiloxane (ingredient B) from the hydrosilation catalyst (ingredient C). This can be achieved by packaging the curable composition in two or more containers with ingredients B and C in separate containers. Alternatively, the catalyst can be microencapsulated in a layer of a thermoplastic or thermosetting organic polymer. Curable compositions containing a microencapsulated platinum-containing hydrosilation catalyst are described in U.S. Pat. No. 4,766,176 which issued to C. Lee et al. on Aug. 23, 1988.

4. The Adhesion Promoter

The ingredient contributing to the adhesion developed during curing of the present compositions is an organosilicon compound containing at least one alkoxy group and at least one organofunctional group selected from epoxy, ethylenically unsaturated groups and polymers derived from homo- or copolymerization of the ethylenically unsaturated groups. All of these organofunctional groups are bonded to silicon through carbon.

Suitable organosilicon compounds include silanes, hydrolysis products of these silanes and polyorganosiloxanes containing at least one of the organofunctional groups and at methods for free radical polymerization of ethylenically unsaturated compounds.

Ingredient D can be present as one of the ingredients of the present compositions, in which instance it would constitute from 0.1 to about 10 weight percent of the composition. Alternatively, this ingredient can be incorporated into a primer composition that is coated on a substrate prior to application of a curable composition of this invention containing ingredients A, B, C and any additional optional ingredients. Primer compositions typically contain the organofunctional silane, a hydrolysis-condensation catalyst for the silane and a suitable volatile solvent.

5. Optional Ingredients

The present compositions may contain a variety of additional ingredients to modify the properties of the composition or the material obtained by curing the composition. To achieve high levels of tensile and strengths and other physical properties desirable in elastomers, the curable composition may contain a reinforcing silica filler. This type of filler is typically treated with one or more of the known silica treating agents to prevent a phenomenon referred to as "creping" or "crepe hardening" during processing of the curable composition.

Any finely divided form of silica can be used as the reinforcing filler. Colloidal silicas are preferred because of their relatively high surface area, which is typically at least 50 square meters per gram. Fillers having surface areas of at least two alkoxy groups per molecule. Preferred organosilicon compounds are silanes and hydrolysis-condensation products or polymers derived from these silanes. The silanes can be represented by the general formula $$R^4_a XSi(OR^5)_{3-a}$$

where $R^4$ and $R^5$ represent alkyl radicals containing from 1 to about 4 carbon atoms and X is selected from the group consisting of epoxy and ethylenically unsaturated groups. The X group is bonded to silicon through a carbon atom.

The organofunctional organosilicon compound can be used alone or in combination with polyorganosiloxanes containing the same types of organofunctional groups that can be present on the adhesion promoter. A particularly preferred combination is an epoxy-substituted silane such as 3-glycidoxypropyl-trimethoxysilane and a polyorganosiloxane containing at least one silicon-bonded vinyl radical and at least one silanol group per molecule. Preferred compounds of this type are liquid hydroxyl-terminated polymethylvinylsiloxanes. Adhesion promoters of this type are described in U.S. Pat. No. 4,087,585, which issued to Jay Schulz on May 2, 1978.

A second class of adhesion promoters that can be present in the compositions of this invention are copolymers derived at least in part from a methacryloxy functional alkoxysilane such as methacryloxypropyltrimethoxysilane and an ester of an ethylenically unsaturated acid such as methyl methacrylate. These copolymers can be prepared using conventional least 200 square meters per gram are preferred for use in the present method. Colloidal silicas can be prepared by precipitation or a fume process. Both of these preferred types of silica are commercially available.

The amount of finely divided silica used in the present compositions is at least in part determined by the physical properties desired in the cured elastomer. Liquid or pumpable polyorganosiloxane compositions typically contain from about 5 to about 60 percent by weight of silica, based on the weight of polydiorganosiloxane. This value is preferably from about 20 to about 40 percent.

Silica treating agents are typically low molecular weight organosilicon compounds containing silicon-bonded hydroxyl groups or groups that can be hydrolyzed to hydroxyl groups in the presence of water. Typical hydrolyzable groups include halogen atoms such as chlorine amino and other groups containing a silicon-bonded nitrogen atom.

The present compositions may also contain a resinous organosiloxane copolymer consisting essentially of $R^3SiO_{1/2}$, $R'R_2SiO_{1/2}$ and $SiO_{4/2}$ units, where R represents a lower alkyl radical and R' represents an alkenyl radical. These copolymers are well known in the art and are described in U.S. Pat. No. 2,676,182, which issued to Daudt and Tyler on Apr. 20, 1954 and is hereby incorporated in this specification by reference thereto.

Additional optional ingredients that can be present include but are not limited to extending fillers such as quartz, calcium carbonate and diatomaceous earth, pigments such as carbon black, titanium oxide and zinc oxide, ultraviolet light absorbing agents, and flame retarding materials such as hydrated aluminum oxide.

EXAMPLES

The following examples describe preferred embodiments of the present curable organosiloxane compositions and should not be interpreted as limiting the scope of the invention defined in the accompanying claims. Unless otherwise specified all parts and percentages in the examples are by weight and viscosities were measured at 25° C.

EXAMPLE 1

A curable composition of this invention was prepared using the following ingredients:

As ingredient A1, 63.6 parts of a dimethylsiloxane/methyl-3,3,3- trifluoropropyl) siloxane containing 58 mole percent of methyl-3,3,3-trifluoropropylsiloxane units, 41 mole percent of dimethylsiloxane units, 1 mole percent of vinyl radicals and exhibiting a viscosity of 12.1 Pa.s. The terminal groups of this polymer exhibit the formula $ViMe_2SiO(Me_2SiO)_n$ where Vi represents a vinyl radical, Me is methyl and the value of n is from 2 to about 4. Ingredient A1 was prepared by the base catalyzed polymerization of the corresponding cyclic siloxanes in the presence of a dimethylvinylsiloxy-terminated polydimethylsiloxane containing an average of 8.8 dimethylsiloxane units per molecule as the chain terminator.

As ingredient A2, 7.0 parts of a dimethylvinylsiloxy-terminated dimethylsiloxane/methyl-3,3,3-trifluoropropylsiloxane copolymer containing the same molar ratio of these siloxane units as ingredient A1 and exhibiting a viscosity of 0.55 Pa.s. Ingredients A1 and A2 were prepared using the same reactants.

As ingredient B, 1.4 parts of an trimethylsiloxy-terminated dimethylsiloxane/methylhydrogensiloxane copolymer containing an average of five methylhydrogensiloxane units and three dimethylsiloxane units per molecule with a silicon-bonded hydrogen atom content in the range from about 0.7 to 0.8 weight percent.

As the platinum-containing hydrosilation catalyst (ingredient D), 0.2 part of a reaction product of hexachloroplatinic acid and sym-tetramethyldivinyldisiloxane that had been diluted with a liquid dimethylvinylsiloxy terminated polydimethylsiloxane in an amount sufficient to achieve a platinum content of 0.62 weight percent.

As the reinforcing filler, 22.2 parts of a fume silica treated to contain trimethylsiloxy and dimethylvinylsiloxy groups.

As pigments 0.74 part of zinc oxide, 1.83 parts of titanium oxide, and 0.74 part of carbon black.

As platinum catalyst inhibitors, 0.24 part of cyclic dimethylsiloxane tetramer and 0.06 part of 1-ethynylcyclohexanol, As the first adhesion promoter, 2 parts of 3-glycidoxypropyltrimethoxysilane, referred to hereinafter as composition A, and as the second adhesion promoter, a 15 weight percent solution in ethyl acetate of a copolymer containing an average of 95 methyl methacrylate units, five 3-trimethoxysilylpropylmethacrylate units and one 3-methoxysilylmercapto terminal unit per molecule. The copolymer was present at a concentration of 0.3 weight percent. The composition containing this adhesion promoter will be referred to as composition B.

Curable composition A of the present invention was coated as a 0.06 inch (0.15 cm)-thick layers on an aluminum panel and composition B was coated in the same manner on a glass panel. The layer of curable composition was covered with a ½ inch (1.2 cm)-wide strip of 120 mesh stainless steel screening that was longer than the panel. The screening was coated with a 0.06 inch (0.15 cm)-thick layer of the curable composition. The resultant composite was heated for 16 hours at a temperature of 100° C. to cure the organosiloxane composition, and then remained under ambient conditions for at least 24 hours.

The peel strength of the cured composition was determined by bending the exposed, uncoated section of the stainless steel screen through an angle of 180 degrees, securing the uncoated end of the screen and the edge of the aluminum of glass panel adjacent to the uncoated portion of the screen in the jaws of a tensile tester and applying a force sufficient to peel the screen from the panel. The force required to peel the screen from the panel and the type of failure (adhesive or cohesive) are recorded in Table 1.

For comparative purposes a curable organosiloxane composition, referred to hereinafter as composition C, containing the types and amounts of ingredients as compositions A and B, with the exception of omitting the adhesion promoter was prepared, coated on an aluminum panel, cured and tested for peel strength as described in the preceding section of this example. The results of the adhesion test are also recorded in Table 1.

TABLE 1

| Composition | Peel Strength (ppi//kN/m) | Type of Failure |
|---|---|---|
| A (Aluminum) | 21.4 // 3.7 | Cohesive |
| B (Glass) | 19.4 // 3.4 | Cohesive |
| C (Aluminum) | 6.1 // 1.1 | Adhesive |

EXAMPLE 2

This example demonstrates the superior adhesion exhibited by cured compositions of the present invention relative to a composition wherein the vinyl-containing polydiorganosiloxane does not contain at least two dimethylsiloxane unit between the terminal unit and the first fluorine-containing organosiloxane unit.

A curable composition of this invention (composition D) was prepared by blending to homogeneity the ingredients of composition A described in the preceding example 1 with the exception that the adhesion promoter consisted essentially of 1 part of glycidoxypropyltrimethoxysilane and 1 part of a hydroxyl terminated polymethylvinylsiloxane containing about 4 weight percent of silicon-bonded hydroxyl groups.

A curable organosiloxane composition used for comparative purposes (composition E) was prepared by blending the following ingredients to homogeneity 72.11 parts of a dimethylvinylsiloxy-terminated polymethyl-3,3,3-trifluoropropylsiloxane exhibiting a viscosity of about 67,800 cps ( 67.8 Pa.s);

5.86 parts of a dimethylvinylsiloxy-terminated polymethyl-3,3,3-trifluoropropylsiloxane exhibiting a viscosity of about 1145 cps (1.145 Pa.s);

As the hydrosilation catalyst, 0.12 part of a complex containing 0.67% platinum and prepared by the reaction of hexachloroplatinic acid with a liquid dimethylvinylsiloxy terminated poly(methyl-3,3,3-trifluoropropyl)siloxane;

0.62 part of zinc oxide;

1.95 parts of titanium dioxide;

14.84 parts of a fumed silica containing dimethyl-3,3,3-trifluoropropylsiloxy and dimethylvinylsiloxy groups;

1.86 parts of an organohydrogensiloxane crosslinking reactant represented by the average formula

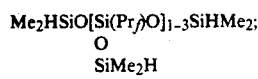

As a platinum catalyst inhibitor, 0.02 part of methylbutynol;

0.63 part of carbon black; and

The adhesion promoter contained 1 part of glycidoxypropyl-trimethoxysilane and 1 part of a hydroxyl terminated polymethylvinylsiloxane containing about 4 weight percent of silicon-bonded hydroxyl groups.

The resultant curable compositions D and E were coated, cured and tested for adhesion as described in Example 1, and the results of this evaluation were as follows:

| Composition | Peel Strength (pli//kN/m) | Type of failure |
|---|---|---|
| D | 17.4 // 3.045 | 35% cohesive, 65% adhesive from the screen, not the panel |
| E | 8.3 // 1.45 | 100% adhesive failure from panel |

That which is claimed is:

1. A curable organosiloxane composition comprising
A. a polyorganosiloxane containing at least two silicon-bonded alkenyl radicals per molecule where at least 20 percent of the siloxane units contain a silicon-bonded perfluoroalkylethyl radical and the silicon atoms containing said alkenyl radicals are separated by at least two dimethylsiloxane units from the closest silicon atom containing said perfluoroalkylethyl radical;
B. as the curing agent for said composition, an organohydrogensiloxane containing an average of more than two silicon-bonded hydrogen atoms per molecule;
C. an amount of a hydrosilation catalyst sufficient to promote curing of said composition, where said catalyst is selected from the group consisting of metals from the platinum group of the periodic table and compounds of these metals; and
D. as the adhesion promoter, an effective amount of an alkoxy-substituted organosilicon compound containing at least one organofunctional substituent bonded to silicon through carbon, where said substituent is selected from the group consisting of epoxy, amino, alkenyl, alkyl esters of ethylenically unsaturated carboxylic acids and polymers derived from said acids, and the concentration of said organosilicon compound is sufficient to achieve adhesion between said composition and a substrate in contact with said composition during curing.

2. A composition according to claim 1 where the adhesion promoter contains at least three alkoxy groups per molecule, the concentration of said adhesion promoter is from 0.1 to 10 parts by weight per 100 parts by weight of said polyorganosiloxane, said polyorganosiloxane is a polydiorganosiloxane wherein from 40 to about 95 mole percent of the diorganosiloxane units are methyl-3,3,3-trifluoropropylsiloxane, the remaining diorganosiloxane units are dimethylsiloxane, the terminal units are dimethylvinylsiloxy, and the silicon-bonded organic radicals present in said organohydrogensiloxane are selected from the group consisting of methyl and 3,3,3-trifluoropropyl radicals.

3. A composition according to claim 2 where the organofunctional group present in said adhesion promoter is selected from the group consisting of 3-glycidoxypropyl, epoxycyclohexyl, vinyl, 3-acryloxypropyl and 3methacryloxypropyl.

4. A composition according to claim 3 where an adhesion promoter containing said 3-glycidoxypropyl or epoxycyclohexyl group is present in combination with a liquid silanol-terminated polydimethylsiloxane containing at least one silicon-bonded vinyl radical per molecule.

5. A composition according to claim 2 where said adhesion promoter is a copolymer derived at least in part from a methacryloxy functional alkoxysilane and an ester of an ethylenically unsaturated acid.

6. A composition according to claim 1 where said composition is packaged in at least two containers where said organohydrogensiloxane and said hydrosilation catalyst are located in different containers.

* * * * *